United States Patent
Zhu et al.

(10) Patent No.: US 10,428,594 B2
(45) Date of Patent: Oct. 1, 2019

(54) ALIGNMENT GUIDE FEATURE FOR METAL TO METAL SEAL PROTECTION ON MECHANICAL CONNECTIONS AND COUPLINGS

(71) Applicant: Vetco Gray Inc., Houston, TX (US)

(72) Inventors: Baozhi Zhu, Houston, TX (US); Joseph W. Pallini, Houston, TX (US); Thomas Steen, Houston, TX (US); William R. Patterson, Jr., Houston, TX (US)

(73) Assignee: Vetco Gray, LLC, Houston, TX (US)

( * ) Notice: Subject to any disclaimer, the term of this patent is extended or adjusted under 35 U.S.C. 154(b) by 1021 days.

(21) Appl. No.: 14/230,940

(22) Filed: Mar. 31, 2014

(65) Prior Publication Data

US 2015/0145247 A1    May 28, 2015

Related U.S. Application Data

(60) Provisional application No. 61/907,687, filed on Nov. 22, 2013.

(51) Int. Cl.
*F16L 15/00* (2006.01)
*E21B 17/042* (2006.01)

(52) U.S. Cl.
CPC .......... *E21B 17/042* (2013.01); *F16L 15/004* (2013.01)

(58) Field of Classification Search
CPC ............................. E21B 17/042; F16L 15/004
(Continued)

(56) References Cited

U.S. PATENT DOCUMENTS 2,992,021 A * 7/1961 Nay ................... E21B 17/0426
                                                            285/334
3,224,799 A   12/1965 Blose et al.
(Continued)

FOREIGN PATENT DOCUMENTS

CN    101248306 A    8/2008
DE       4446806       5/1996
(Continued)

OTHER PUBLICATIONS

International Search Report and Written Opinion issued in connection with corresponding PCT Application No. PCT/US2014/066634 dated Aug. 18, 2015.
(Continued)

*Primary Examiner* — Anna M Momper
*Assistant Examiner* — Fannie C Kee
(74) *Attorney, Agent, or Firm* — Hogan Lovells US LLP

(57) ABSTRACT

A connection is established between a pin connector and a box connector defined on a pair of tubular members such as casing segments in the field of oil and gas recovery. The pin connector and box connector include features for the protection of metallic-sealing surfaces during assembly, disassembly, transport and handling of the tubular members. The pin connector includes a stabbing flank with an inwardly tapered annular flank surface thereon, and an alignment protrusion extending outward with respect to the pin-side metallic sealing surface in a direction normal to a cone angle defined by the inwardly tapered annular flank surface. The alignment protrusion engages internal surfaces of the box connector to concentrically align the pin connector with the box connector, and thereby protects the metallic sealing surfaces from damage that might otherwise result from collisions between the pin connector and the box connector.

9 Claims, 3 Drawing Sheets

(58) Field of Classification Search
USPC .................................. 285/333–334, 355, 390
See application file for complete search history.

(56) References Cited

U.S. PATENT DOCUMENTS

| | | | |
|---|---|---|---|
| 3,489,437 A * | 1/1970 | Duret | E21B 17/042 |
| | | | 285/332.2 |
| 3,870,351 A | 3/1975 | Matsuki | |
| 4,384,737 A | 5/1983 | Reusser | |
| 4,494,777 A * | 1/1985 | Duret | E21B 17/042 |
| | | | 285/334 |
| 4,521,042 A * | 6/1985 | Blackburn | E21B 17/0423 |
| | | | 285/334 |
| 4,603,886 A | 8/1986 | Pallini, Jr. et al. | |
| 4,624,488 A * | 11/1986 | Furgerson | E21B 17/0423 |
| | | | 285/334 |
| 4,770,444 A | 9/1988 | Hauk | |
| 4,946,201 A | 8/1990 | Tai | |
| 5,064,224 A | 11/1991 | Tai | |
| 5,066,052 A | 11/1991 | Read | |
| 5,505,502 A | 4/1996 | Smith et al. | |
| 5,964,486 A * | 10/1999 | Sinclair | F16L 15/004 |
| | | | 285/331 |
| 6,056,324 A | 5/2000 | Reimert et al. | |
| 6,347,814 B1 * | 2/2002 | Cerruti | F16L 15/002 |
| | | | 285/332.4 |
| 6,478,344 B2 | 11/2002 | Pallini et al. | |
| 6,511,102 B2 | 1/2003 | Krug et al. | |
| 6,626,471 B2 | 9/2003 | Mallis | |
| 6,682,107 B2 | 1/2004 | Munk et al. | |
| 6,832,789 B2 | 12/2004 | Church | |
| 7,334,821 B2 | 2/2008 | Dutilleul et al. | |
| 7,585,002 B2 | 9/2009 | Curley et al. | |
| 7,798,536 B2 | 9/2010 | Hashem et al. | |
| 7,931,311 B2 | 4/2011 | Dudedout et al. | |
| 8,011,698 B2 | 9/2011 | Verger et al. | |
| 8,029,025 B1 | 10/2011 | Sivley et al. | |
| 8,038,179 B2 | 10/2011 | Takano et al. | |
| 8,056,940 B2 | 11/2011 | Morgan et al. | |
| 8,079,623 B2 | 12/2011 | Pallini, Jr. et al. | |
| 8,146,960 B2 | 4/2012 | Dudedout et al. | |
| 2010/0270793 A1 * | 10/2010 | Takano | F16L 15/00 |
| | | | 285/333 |
| 2014/0070526 A1 | 3/2014 | Pallini, Jr. | |

FOREIGN PATENT DOCUMENTS

| | | |
|---|---|---|
| FR | 2529991 A1 | 1/1984 |
| WO | 198502651 A1 | 6/1985 |
| WO | 2004109173 A1 | 12/2004 |
| WO | 2015049097 A1 | 4/2015 |

OTHER PUBLICATIONS

Unofficial English translation of Office Action issued in connection with corresponding CN Application No. 201480063982.7 dated May 2, 2017.

* cited by examiner

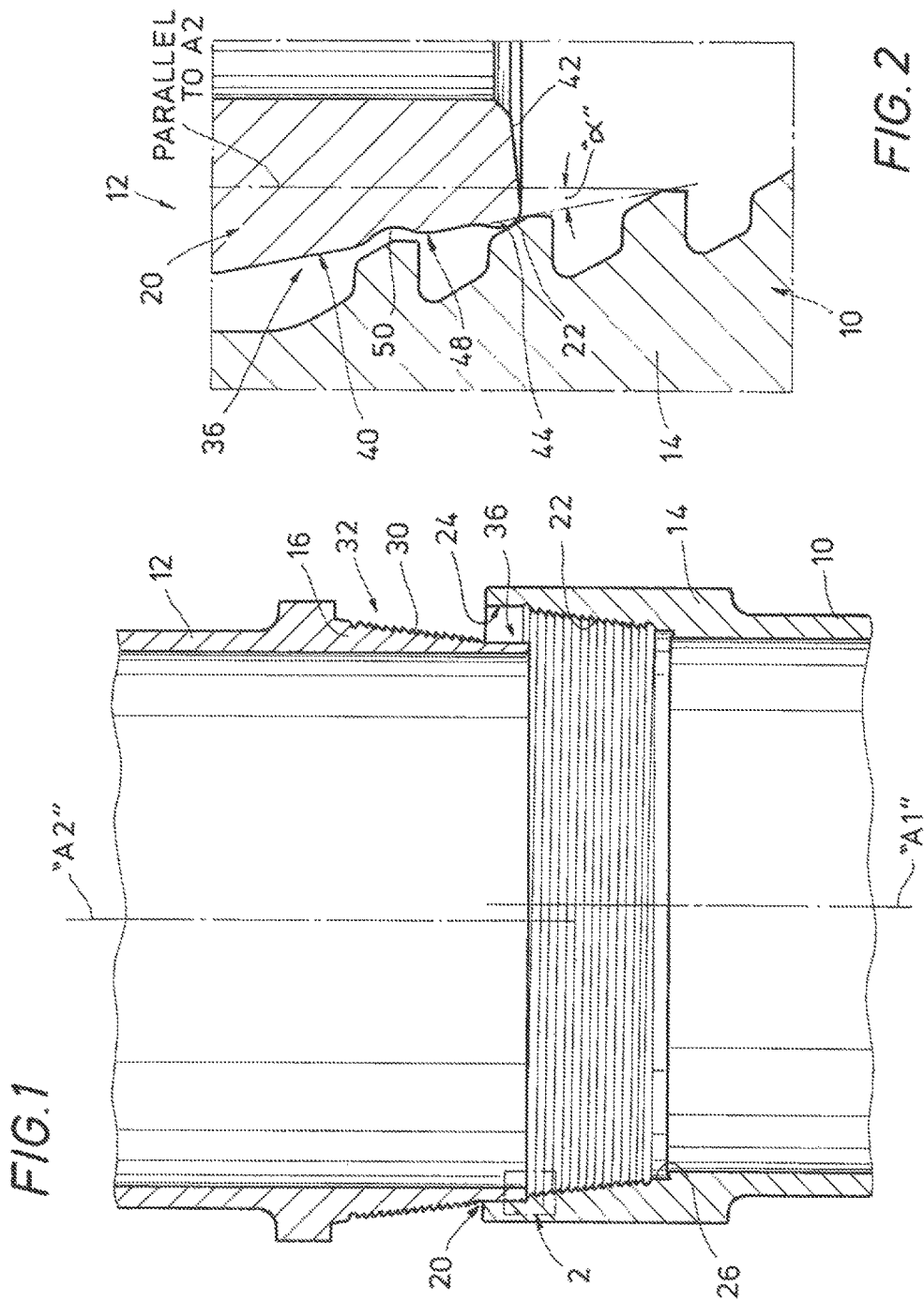

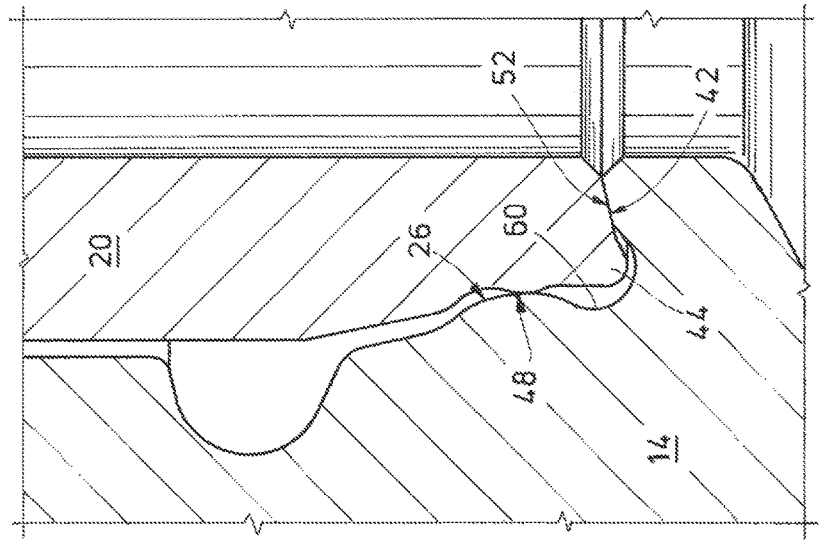
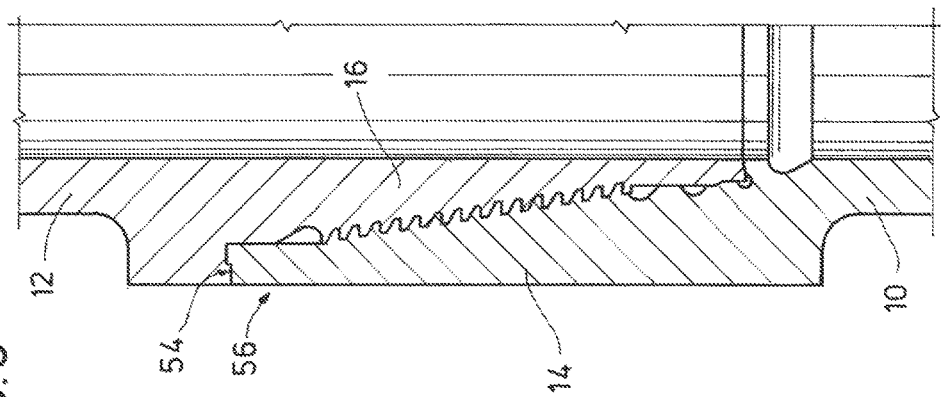

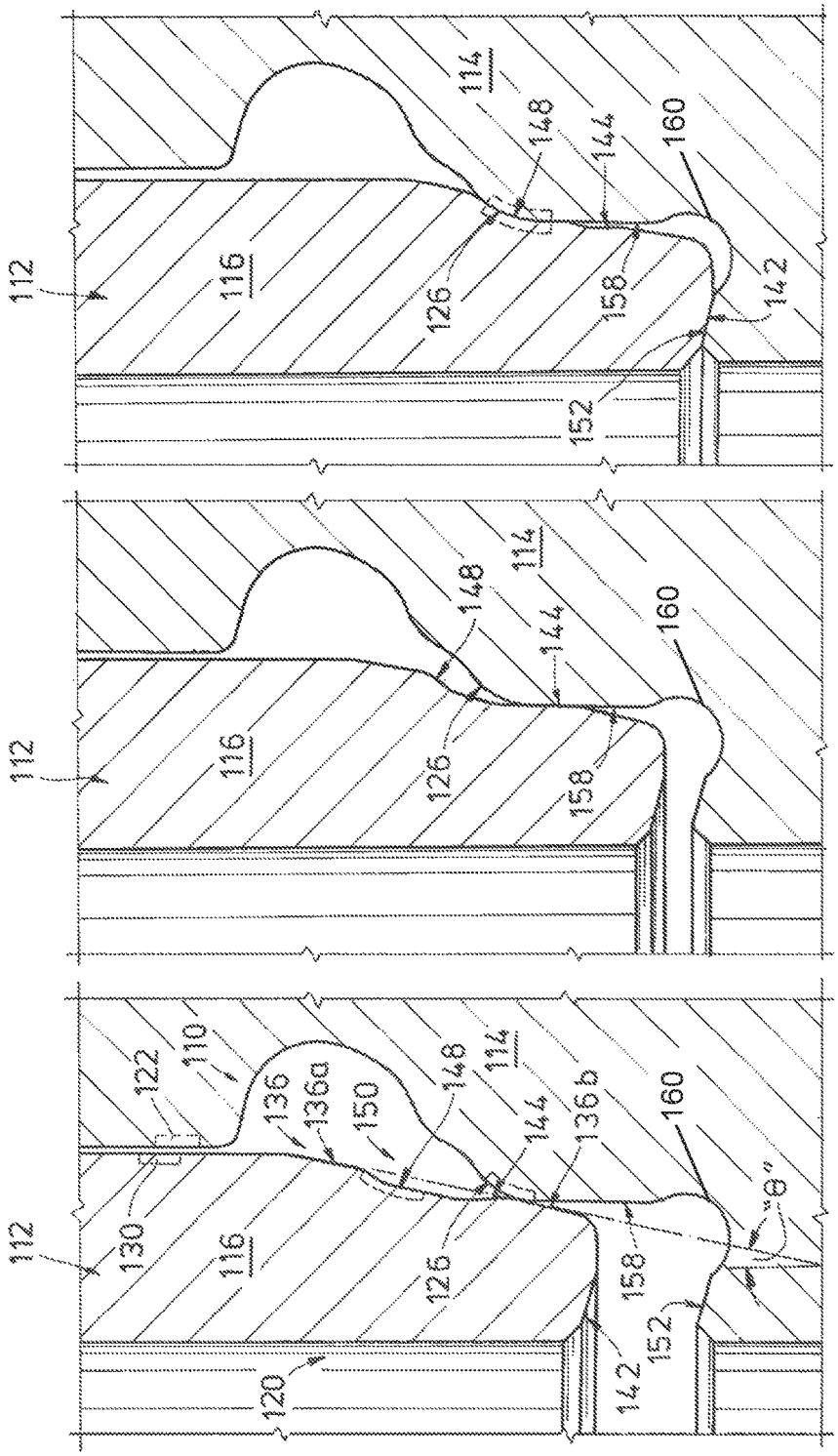

ALIGNMENT GUIDE FEATURE FOR METAL TO METAL SEAL PROTECTION ON MECHANICAL CONNECTIONS AND COUPLINGS

RELATED APPLICATION

This application claims the benefit of and priority to U.S. Provisional Patent Application No. 61/907,687, titled "Alignment Guide Feature for Metal to Metal Seal Protection on Mechanical Connections and Couplings" filed Nov. 22, 2013, which is incorporated herein by reference in its entirety.

BACKGROUND OF THE INVENTION

1. Field of the Invention

The present invention relates in general to connecting tubular members, e.g., in the field of oil and as recovery. In particular, the disclosure relates to the alignment and connection of adjacent tubular members within a wellbore, e.g., the installation of a casing segment into a wellbore to form a fluid seal with an adjacent casing segment.

2. Brief Description of Related Art

A variety of wellbore operations include the connection of adjacent tubular members such as pipe, drill string, riser sections, casing segments, and the like. Some of the joints established between the tubular members can employ metal-to-metal seals to form fluid-tight connections. Often, the tubular members include sealing surfaces that are integral with the metallic structure of the tubular members. Such integral seals can be formed more rapidly, and at a lower cost, than distinct metal or elastomeric seal components. Distinct seal components must be placed between the tubular members during make-up or assembled to one or both of the tubular members before being lowered into the wellbore. One challenge of working with integral metal-to-metal seals is preventing damage to the surface finish on the sealing surfaces, and thereby facilitating effective formation of fluid-tight connections.

Tubular members, and the oilfield equipment used to transport and handle the tubular members, are often large and cumbersome. Thus, assembling tubular members to one another without causing damage to the sealing surfaces can be difficult. For example, due to the large masses of the tubular members and oilfield equipment, even low-speed collisions can produce sufficient force to damage the sealing surfaces while attempting to land or align a tubular member. Therefore, stab guides, shields, protective coatings or other additional protectors are often provided to protect the metal-to-metal sealing surfaces. These protectors add cost and, depending on the protector design, can be dislodged from a tubular member and lost. In some cases, removal of these protectors can be required where they interfere with the final stages of assembly, such as the final rotation(s) of a threaded in connector after being stabbed into a box connector of an adjacent tubular member. The removal of these protectors can slow the assembly process and leave the sealing surfaces exposed during a stage of assembly where the sealing surfaces are at risk.

In light of the above, a demand exists for protecting the metal-to-metal sealing surfaces on tubular members without the need to provide distinct protectors. Also, recognizable is a demand for protecting the sealing surfaces during final makeup after the pin and box connectors are stabbed together.

SUMMARY OF THE INVENTION

A tubular connection is described having features for the protection of sealing surfaces defined on a pair of tubular members. In some cases, both the sealing surfaces and the protective features can be integral to the geometry and/or the metallic structure of the tubular members, in some cases, the protective features operate to concentrically align the tubular members and thereby protect the sealing surfaces from collisions. Protection of the sealing surfaces can facilitate the establishment of a fluid-tight seal between the tubular members.

According to one aspect of the invention, a tubular connection includes a first tubular member having box connector defined at an upper end thereof. The box connector defines a first longitudinal axis and includes threads or other internal mating features along an internal surface thereof. A box-side metallic sealing surface is defined on the internal surface below the internal mating features. The tubular connection also includes a second tubular member having as pin connector defined at a lower end thereof. The pin connector defines a second longitudinal axis and includes threads or other external mating features defined along an external surface thereof, which are operable to engage the internal mating features of the box connector to couple the first and second tubular members to one another. The pin connector further includes a stabbing flank defined on the external surface below the external mating features. The stabbing flank includes an annular flank surface that is tapered radially inwardly in a direction toward the lower end of the pin to define a cone angle with respect to the second longitudinal axis. A pin-side metallic sealing surface is defined on the annular flank surface, which is operable to engage the box-side metallic sealing surface to form a fluid seal therewith when the external mating features are engaged with the internal mating features. The stabbing flank also includes an alignment protrusion extending outward with respect to the pin-side metallic sealing surface in a direction normal to the cone angle. The alignment protrusion is defined below the pin-side metallic sealing surface such that the alignment protrusion is operable to engage the internal mating features of the box connector to concentrically align the pin connector with the box connector and urge the pin-side metallic sealing surface radially inward and away from the internal mating features when the pin connector is stabbed into the box connector.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment, thereof which is illustrated in the appended drawings, which drawings form a part of this specification. It is to be noted, however, that the drawings illustrate only preferred embodiments of the invention and are therefore not to be considered limiting of its scope as the invention may admit to other equally effective embodiments.

FIG. 1 is a partial, cross-sectional view of first and second tubular members in a decoupled and misaligned configuration occurring prior to coupling the second tubular member to the first tubular member in accordance with an example embodiment of the present disclosure.

FIG. 2 is an enlarged view of the area of interest identified in FIG. 1 illustrating an alignment protrusion and a metallic sealing surface defined on the second tubular member that facilitate metal-to-metal sealing with a metallic sealing surface on the first tubular member.

FIG. 3 is a partial, cross-sectional view of the first and second tubular members of FIG. 1 in a fully connected configuration.

FIG. 4 is an enlarged view of the area of interest identified in FIG. 3 illustrating the metallic sealing surface of FIG. 2 in sealing engagement with one another.

FIGS. 5-7 are cross-sectional views of an alternate embodiment of an alignment protrusion and metallic sealing surface similar to those of FIG. 2 (on a reverse lateral side of the first and second tubular components), which collectively illustrate a sequence for coupling a second tubular member to a first tubular member.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided an that this disclosure will be thorough and complete, and will fully convey the scope of the invention to those skilled in the art. Like numbers refer to like elements throughout, and the prime notation, if used, indicates similar elements in alternative embodiments.

Referring to FIG. 1, a first tubular member 10 and a second tubular member 12 comprise sections of casing for completing a wellbore (not shown). In other embodiments, first and second tubular members 10, 12 comprise other wellbore components such as wellhead housing components, tubing string sections, pipe, riser sections, drill string sections, etc. The first tubular member 10 includes a box connector 14 at an upper end thereof, and the second tubular member 12 includes a pin connector 16 at a lower end thereof. The box connector 14 and the pin connector 16 are operable to engage one another to couple the first and second tubular members 10, 12 to one another. The relative positions described in this specification, such as "above" or "below" are for description only. The components described can be used in any orientation.

First and second tubular members 10, 12 are depicted in a decoupled and misaligned configuration. The box connector 14 defines a first longitudinal, axis "A1" that is obliquely arranged with respect to a second longitudinal axis "A2" defined by the pin connector 16. The oblique or misaligned arrangement, of the longitudinal axes "A1" and "A2" typically occurs in wellbore operations such as stabbing, e.g., during make-up and break-out of the first and second tubular members 10, 12. As one skilled in the art will recognize, this misalignment can lead to galling at a leading end 20 of pin connector 16, particularly when pin connector 16 and box connector 14 are constructed of similar materials. Galling can compromise a metal-to-metal seal formed between first and second tubular members 10, 12 when in a fully made-up configuration as described, in greater detail below.

The box connector 14 includes internal mating features 22 defined along an annular internal surface 24 thereof. In the illustrated embodiment, internal mating features 22 are helical threads constructed of the same metallic structure of a body of first tubular member 10. In other embodiments, internal mating features are parallel grooves or other structures for engaging pin connector 16 to thereby couple first and second tubular members 10, 12 to one another.

A box-side metallic sealing surface 26 is defined on the internal surface 24 below the internal mating features 22. As recognized by those skilled in the art, a box-side metallic sealing surface 26 disposed below the mating features 22 others protection to the box-side metallic sealing surface 26 due to the recessed location. In other embodiments, box-side metallic sealing surface 26 is disposed at other locations within box connector 14. Box-side metallic sealing surface 26 can exhibit a surface finish that is more highly polished than the surrounding metal surfaces of the internal surface 24. In some embodiments, the box-side metallic scaling surface 26 can exhibit a surface roughness of about 3 µm while the surrounding surfaces of internal surface 24 have a surface roughness of about 8 µm or higher. In some embodiments, box-side metallic sealing surface 26 can be attached to internal surface 24, by welding or as an inlay positioned in and protruding from a groove (not shown). In other embodiments, the box-side metallic scaling surface 26 is a polished portion of the metallic structure of the body of first tubular member 10.

The pin connector 16 includes external mating features 30 defined along an outer external surface 32 thereof. The external mating features 30 are operable to engage the internal mating features 22 of the box connector 14 to couple the first and second tubular members 10, 12 to one another. The pin connector 16 further includes a stabbing flank 36 defined on the external surface 32 below the external mating features 30. The stabbing flank 36 is defined at the leading end 20, and leads the pin connector 16 through the internal mating features 22 as the pin connector 16 is stabbed into the box connector 14.

Referring to FIG. 2, the stabbing flank 36 at the leading end 20 of pin 16 engages mating features 22 of box 14 as second tubular member 12 is lowered into position for engagement with first tubular member 10. The stabbing flank 36 includes an annular flank surface 40 that is tapered radially inwardly in a direction toward the lower end surface 42 of the pin connector. A cone angle "α" with respect to the second longitudinal axis "A2" is defined by the tapered annular flank surface 40. In some embodiments, the cone angle "α" is in the range of about 8 degrees to about 16 degrees, and in some embodiments, the cone angle "α" is about 12 degrees.

An alignment protrusion 44 extends outward with respect to the annular flank surface 40 and a pin-side metallic sealing surface 48 in a direction normal to the cone angle cone angle "α." The alignment protrusion 44 engages internal mating features 22 of box connector 14 as second tubular member 12 is lowered into position, and thereby operates to concentrically align the pin connector 16 with the box connector 14. In the illustrated embodiment, all protrusion 44 is a bulbous or curved feature to facilitate guiding or urging pin connector 16 toward a concentrically aligned arrangement with box connector 14 as the alignment protrusion 44 is axially lowered through mating features 22.

The pin-side metallic sealing surface 48 provided on stabbing flank 36 can be formed by any of the mechanisms described above for forming box-side metallic sealing surface 26. The pin-side metallic sealing surface 48 is disposed on pin connector 16 above the alignment protrusion 44. Thus, the pin-side metallic sealing surface 48 is protected from damage by the engagement of alignment feature 44 with mating features 22 or other wellbore surface encountered by leading end 20 of pin 16 as second tubular member 12 is lowered into position within box connector 14.

An annular groove 50 extending radially inward from the annular flank surface 40 is defined on stabbing flank 36. The annular groove 50 extends inward in a direction normal to the cone angle "α." At least a portion of pin-side metallic sealing surface 48 is disposed within the annular groove 50 further protecting the pin-side metallic sealing surface 48. In the illustrated embodiment, pin-side metallic sealing surface 48 has an upper margin disposed within the annular groove 50 and a lower margin on the tapered annular funk surface 40. Because pin-side metallic sealing surface 48 is located at the transition between annular groove 50 and annular flank surface 40, the pin-side sealing surface 48 has a generally convex shape. The geometry of annular groove 50, and the relationship of the annular groove 50 with pin-side sealing surface 48 is described in greater detail in commonly owned, U.S. patent application Ser. No. 13/606,302, entitled PROTECTED INTEGRAL METAL TO METAL SEAL, filed Sep. 7, 2012 to Pallini et al., which is hereby incorporated by reference herein.

Referring to FIGS. 3 and 4, first and second tubular members 10, 12 are depicted in a fully coupled or made-up configuration. The lower end surface 42 of pin connector 16 rests on an axial compression shoulder 52 defined within the box connector 14. Axial compression shoulder 52 faces generally upwardly, and slopes downward in a radially outward direction. Axial compression shoulder 52 defines a secondary load shoulder, while a primary load shoulder 54 is defined at an upper end 56 of box connector 14. Alignment protrusion 44 extends axially beyond lower end surface 42 to define a lower-most point on pin connector 16. The alignment protrusion 44 is received within an annular relief groove 60 defined in the box connector 14 below axial compression shoulder 52. The alignment protrusion 44 is substantially spaced from the internal surface 24 of the box connector 14 when received within the annular relief groove 60. The annular relief groove 60 ensures that no axial or radial loads are transferred through the alignment protrusion 44 when the fully made-up configuration is achieved. Annular relief groove 60 thus permits proper engagement of pin connector 16 with box connector 44, even in the event that the alignment protrusion 44 is damaged and deformed.

When the lower end surface 42 rests on axial compression shoulder 52, pin-side metallic sealing surface 48 is axially aligned with box-side metallic sealing surface 26. A minimum inner diameter of the box-side metallic scaling surface 26 is less than any portion of annular interior surface 24 above the box-side metallic sealing surface 26. The minimum inner diameter of the box-side metallic sealing surface 26 can be less than a maximum outer diameter of the pin-side metallic sealing surface prior to achieving the fully made-up configuration depicted. Thus, an interference fit can be established when the box-side metallic sealing surface 26 and the pin-side metallic sealing surface 48 are axially aligned and the fully made-up configuration is achieved. The interference fit causes deformation of one or both of the metallic sealing surfaces 26, 48 to form an effective fluid seal between the box and pin connectors 12, 14. The deformation can be fully elastic permitting repeatable assembly and disassembly of the box and pin connectors 12, 14 to establish the fluid seal multiple times. Alternately, the deformation may be plastic or permanent. An effective metal-to-metal seal can be established between metallic sealing surfaces 26, 48 since the pin-side metallic sealing surface 48 is protected and does not engage annular internal surface 24 until being concentrically and axially aligned with box-side metallic scaling surface 26 and first and second tubular members 10, 12 are in the fully made-up configuration.

In one example embodiment of operation, second tubular member 12 is lowered in a generally axial direction toward first tubular member 10 until the stabbing flank 36 of pin connector 16 enters the box connector 14. Any misalignment between the first and second tubular members 10, 12 can cause an impact between the alignment protrusion 44 and internal mating features 22 or other portions of annular internal surface 24. The engagement of the alignment protrusion 44 with the annular internal surface 24 together with the axial movement between the first and second tubular members 10, 12 urges the pin-side metallic sealing surface 48 radially inward and away from the internal mating features 22. Thus, the pin-side metallic sealing surface 48 is protected from impact.

When the pin connector 16 is advanced sufficiently to permit the external mating features 30 to engage the internal mating features 22, the second tubular member 12 can be rotated about longitudinal axis "A2" to threadingly engage the pin connector 16 with box connector 14. Galling and deformation of alignment protrusion 44 by engagement with internal surface 24 during this rotation does not damage or adversely influence the ability of metallic sealing surfaces 26, 48 to form an effective seal. The rotation continues until the alignment protrusion 44 disengages the internal surface 24 and moves into annular relief groove 60 and metallic sealing surfaces 26, 48 engage one another. The rotation and corresponding axial motion of second tubular member 12 can continue, thereby elastically or plastically deforming the metallic sealing surfaces 26, 48 to form an effective fluid seal, until the lower end surface 42 of pin connector 16 engages the axial compression shoulder 52.

Referring now to FIGS. 5-7, an alternate embodiment of a threaded connection can be established between first and second tubular members 110, 112, which respectively define as box connector 114 and pin connector 116. A leading end 120 of pin connector 116 defines a thread stabbing flank 136, which is straightly tapered inwardly toward a lower end surface 142 at angle "θ" with respect to a longitudinal axis (see "A2" in FIG. 1). An upper portion 136a and a lower portion 136b of thread stabbing hank 136 are axially divided by a concave surface or annular groove 150. Upper and lower portions 136a, 136b are both disposed at the angle "θ," such that annular groove 150 can be machined into a conically tapered stabbing flank surface in a manufacturing process as understood ID the art. A pin-side metallic sealing surface 148 is disposed axially between upper and lower portions 136a, 136b within annular groove 150. Pin side metallic sealing surface 148 is not necessarily concave itself, but is protectively disposed within the concavity defined by annular groove 150.

A sacrificial alignment protrusion 144 is defined at the transition between annular groove 150 and the lower portion 136b of the thread stabbing flank 136. Since lower portion 136b of thread stabbing flank 136 taper radially inwardly below sacrificial alignment protrusion 144, and since annular groove 150 is disposed above sacrificial alignment protrusion 144, a local maximum radial dimension is defined at sacrificial alignment protrusion 144. Sacrificial alignment protrusion 144 protrudes in a direction normal to tapered thread stabbing flank 136 with respect to the pin-side metallic sealing surface 148. A sacrificial flat 158 is defined within the box connector 114. Sacrificial flat 158 can be a generally cylindrical surface disposed axially between a convex box-side metallic sealing surface 126 and an annular relief groove 160. Sacrificial flat 158 is positioned for engagement with sacrificial alignment protrusion 144 (see FIG. 6) as pin connector 116 and box connector 114 are axially approximated.

As illustrated in FIG. 5, second tubular member 112 is axially approximated with first tubular member 110 to a position wherein corresponding mating features 122, 130 begin to engage one another, and the sacrificial alignment protrusion 144 begins to engage sacrificial flat 158. The pin-side metallic sealing surface 148 is disposed axially between external mating features 130 and the sacrificial alignment profusion 144, and the box-side metallic sealing surface 126 is disposed axially between the internal mating features 122 and the sacrificial flat 158. Thus, the metallic sealing surfaces 126, 148 are radially supported on opposing axial sides thereof.

As illustrated in FIG. 6, sacrificial alignment protrusion 144 is engaged with sacrificial flat 158 with further axial approximation of second tubular member 112 to guide second tubular member 112 into a central radial position where longitudinal axes A1, A2 (FIG. 1) are aligned. In embodiments where the corresponding mating features 122, 130 are helical threads, further axial approximation is accompanied by rotational motion. The engagement of sacrificial alignment protrusion 144 with sacrificial flat 158 during this rotation operates to prevent wear of pin-side metallic sealing surface 148. Galling and deformation of sacrificial alignment protrusion 144 and sacrificial flat 158 during this rotational engagement does not damage or adversely influence the ability of metallic sealing surfaces 126, 148 to form an effective seal.

In some embodiments, alignment protrusion 144 remains engaged with sacrificial flat 158 as metallic sealing surfaces 126, 148 begin engagement with one another and deform to form a fluid seal. However, as illustrated in FIG. 7, alignment protrusion 144 disengages sacrificial flat 158 prior to second tubular member 112 landing on axial compression shoulder 152. This disengagement allows metallic sealing surfaces 126, 148 to form an interference fit between first and second tubular members 110, 112, thereby ensuring a leak-free seal therebetween.

As one skilled in the art will appreciate, alignment protrusions 44, 144 eliminate a need for cumbersome and expensive external stab guides. Since metallic, sealing surfaces 26, 48, 126, 148 are protected by sacrificial alignment protrusions 44, 144, a repeatable seal can be formed as metallic sealing surfaces 26, 48, 126, 148 are disengaged and reengaged with one another. Additionally, alignment feature 44, 144 may be provided on other wellhead components that are made-up by axial approximation.

While the invention has been shown or described in only some of its forms, it should be apparent to those skilled in the art that it is not so limited, but is susceptible to various changes without departing from the scope of the invention.

What is claimed is:

1. A tubular connection comprising:
    a first tubular member having a box connector defined at an upper end thereof, the box connector defining a first longitudinal axis and including internal mating features along an internal surface thereof and a box-side metallic sealing surface defined on the internal surface below the internal mating features; and
    a second tubular member having a pin connector defined at a lower end thereof, the pin connector defining a second longitudinal axis and including external mating features defined along an external surface thereof, the external mating features operable to engage the internal mating features of the box connector to couple the first and second tubular members to one another, the pin connector further including a stabbing flank defined on the external surface below the external mating features, the stabbing flank comprising:
        an annular flank surface tapered radially inwardly in a direction toward the lower end of the pin connector to define a cone angle with respect to the second longitudinal axis;
        a pin-side metallic sealing surface defined on the annular flank surface, the pin-side metallic sealing surface operable to engage the box-side metallic sealing surface to form a fluid seal therewith at a sealing face when the external mating features are engaged with the internal mating features; and
        an alignment protrusion extending radially outward farther than the pin-side metallic sealing surface at the sealing face in a direction normal to the cone angle, the alignment protrusion located between an end of the pin connector and the pin-side metallic sealing surface such that the alignment protrusion is operable to engage the internal mating features of the box connector to concentrically align the pin connector with the box connector and urge the pin-side metallic sealing surface radially inward and away from the internal mating features when the pin connector is stabbed into the box connector.

2. The tubular connection of claim 1, wherein the box connector includes at least one upward facing axial load shoulder abutting a downward facing surface of the pin connector when the pin and box connectors are disposed in a fully made-up configuration, and wherein the box connector includes an annular relief groove in which the alignment protrusion is received when the pin and box connectors are disposed in the fully made-up configuration.

3. The tubular connection of claim 2, wherein the alignment protrusion is substantially spaced from the internal surface of the box connector when received within the annular relief groove.

4. The tubular connection of claim 1, wherein the alignment protrusion defines a lower-most surface of the pin connector.

5. The tubular connection of claim 1, wherein the stabbing flank further comprises an annular groove thereon extending radially inward with respect to the cone angle, and wherein at least a portion of the pin-side metallic sealing surface is disposed within the annular groove.

6. The tubular connection of claim 5, wherein the alignment protrusion defines a lower portion of the annular flank surface below the annular groove.

7. The tubular connection of claim 5, wherein the lower portion of the annular flank surface and an upper portion of the annular flank surface above the annular groove are both generally arranged at the cone angle.

8. A tubular connection comprising:
    a first tubular member having a box connector defined at an upper end thereof, the box connector including an internal surface defining internal mating features along a portion thereof and a box-side metallic sealing surface; and
    a second tubular member having a pin connector defined at a lower end thereof, the pin connector including an external surface defining external mating features along a portion thereof and a pin-side metallic sealing surface, wherein the pin-side metallic sealing surface is arranged to form a fluid seal with the box-side metallic sealing surface at a sealing face when the external mating features are engaged with the internal mating features, the pin connector further including a stabbing flank defined on the external surface, the stabbing flank comprising:
an annular flank surface tapered radially inwardly to define a cone angle; and
an alignment protrusion extending radially outward farther than the pin-side metallic sealing surface at the sealing face in a direction normal to the cone angle, the alignment protrusion located between an end of the pin connector and the pin-side metallic sealing surface, the alignment protrusion operable to engage the internal surface of the box connector to concentrically align the pin connector with the box connector and to thereby urge the pin-side metallic sealing surface radially inward during axial approximation of the pin connector and box connector.

9. The tubular connection of claim 8, wherein the stabbing flank further comprises an annular groove thereon extending radially inward with respect to the cone angle, and wherein at least a portion of the pin-side metallic sealing surface is disposed within the annular groove.

\* \* \* \* \*